US012328784B2

United States Patent
Khan et al.

(10) Patent No.: US 12,328,784 B2
(45) Date of Patent: Jun. 10, 2025

(54) SYSTEM AND METHOD FOR REDUCING NETWORK COLLISION

(71) Applicant: Verizon Patent and Licensing Inc., Basking Ridge, NJ (US)

(72) Inventors: Taussif Khan, Martinsville, NJ (US); Alexandre De Melo, Basking Ridge, NJ (US); Mary Williams, Miltona, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 392 days.

(21) Appl. No.: 17/813,492

(22) Filed: Jul. 19, 2022

(65) Prior Publication Data

US 2024/0032125 A1    Jan. 25, 2024

(51) Int. Cl.
*H04W 76/18*    (2018.01)
*H04W 48/16*    (2009.01)
*H04W 48/18*    (2009.01)

(52) U.S. Cl.
CPC .......... *H04W 76/18* (2018.02); *H04W 48/16* (2013.01); *H04W 48/18* (2013.01)

(58) Field of Classification Search
CPC ..... H04W 76/18; H04W 48/16; H04W 48/18; H04W 28/04; H04W 48/02; H04L 47/74; H04L 12/5691; H04B 1/7075
See application file for complete search history.

(56) References Cited

U.S. PATENT DOCUMENTS

| 10,834,571 B1* | 11/2020 | Yau | H04W 12/06 |
|---|---|---|---|
| 2012/0189016 A1* | 7/2012 | Bakker | H04W 76/11 370/401 |
| 2015/0072678 A1* | 3/2015 | Zhang | H04W 8/065 455/433 |
| 2017/0374695 A1* | 12/2017 | Lau | H04W 76/11 |

FOREIGN PATENT DOCUMENTS

WO    WO-2019029883 A1 *    2/2019    ............ H04W 48/06

* cited by examiner

*Primary Examiner* — Mewale A Ambaye

(57) ABSTRACT

A device includes a processor that may be configured to obtain a Public Land Mobile Network (PLMN) identifier (ID) from a signal broadcast by a network and determine whether the obtained PLMN ID is an original preferred PLMN ID of the device. When the processor determines that the obtained PLMN ID is the original preferred PLMN ID, the processor may attempt to attach to the network over a wireless link. When the attempt to attach to the network fails, the processor may rewrite, in a list of PLMN IDs, a non-preferred PLMN ID as a new preferred PLMN ID.

20 Claims, 9 Drawing Sheets

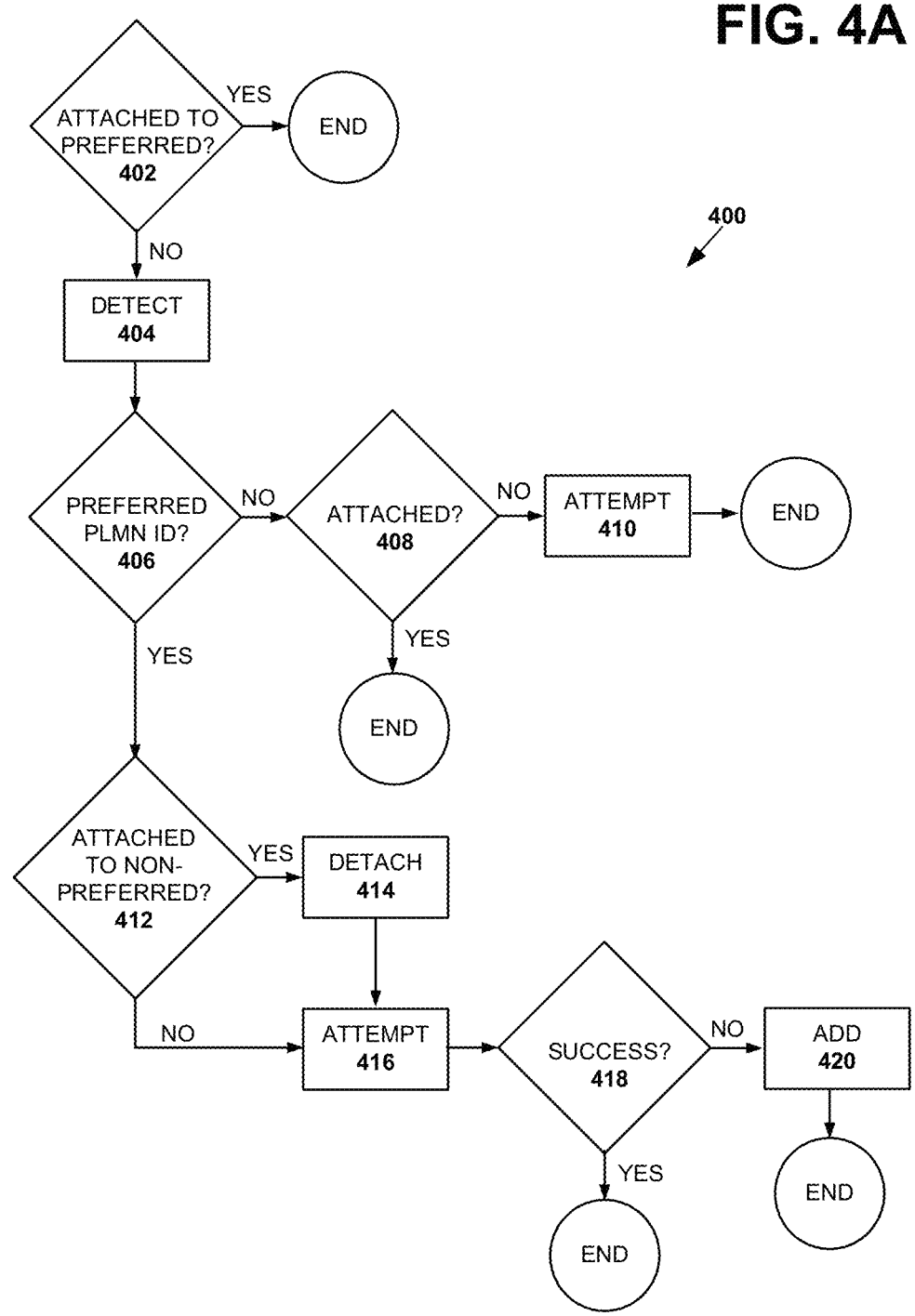

SYSTEM AND METHOD FOR REDUCING NETWORK COLLISION

BACKGROUND INFORMATION

Modern smart phones may be capable of accessing more than one cellular network. Each cellular network may be a private mobile network or a public land mobile network (PLMN). For example, an employee may use a smart phone to attach to a cellular network of the employer. By using the smart phone, the employee may access network services and application available only to the employees. If the smart phone is also subscribed to a public cellular network, the employee may attach to the public cellular network for Internet connectivity, to be on social media or to use another network service.

BRIEF DESCRIPTION OF THE DRAWINGS

FIGS. 4A and 4B are flow diagrams of exemplary processes that are associated with avoiding multiple network collisions, according to an implementation.

DETAILED DESCRIPTION OF EXAMPLE EMBODIMENTS

The following detailed description refers to the accompanying drawings. The same reference numbers in different drawings may identify the same or similar elements. As used herein, the term Universal Integrated Circuit Card (UICC) may not only refer to a UICC, but also other UICC-like devices, such as an embedded UICC (eUICC), a Subscriber Identity Module (SIM), an embedded SIM (eSIM), etc. As used herein, the term a "public land mobile network" (PLMN) may refer to a cellular network, regardless of whether the cellular network is a public cellular network (e.g., a cellular network that is open for subscription to general public) or a private cellular network (e.g., a cellular network that is open for subscription to members of an organization). A PLMN identifier (ID) may refer to an identifier of or for a PLMN.

The term "primary cellular network," "primary PLMN," or "primary network" for a User Equipment device (UE) may refer to a main cellular network to which the UE is subscribed. The term "secondary cellular network," "secondary PLMN," or "secondary network" for a UE may refer to a backup cellular network to which the UE is subscribed.

The term "preferred network," "preferred PLMN," or "preferred cellular network" of a UE may refer to a PLMN to which the UE prefers to attach (or connect to) among PLMNs to which the UE is subscribed. For example, a UE would attempt to attach to its preferred network first. If the UE is attached to a non-preferred network, the UE may nonetheless attempt to attach to its preferred network if the preferred network is available for attachment. In the following, PLMN IDs of or for a primary PLMN, a secondary PLMN, a preferred PLMN, and a non-preferred PLMN may be referred to as, respectively, a primary PLMN ID, a secondary PLMN ID, a preferred PLMN ID, and a non-preferred PLMN ID.

The systems and methods described herein relate to reducing or avoiding what is herein referred to as network collisions. A network collision may occur when a UE is within coverage areas of networks, to which the UE is not subscribed (referred to herein as foreign networks), that have the same network identifier as the network to which the UE is subscribed. When a UE is within the coverage area of a foreign network that has the same network identifier as the preferred network to which the UE is subscribed, the UE may attempt to attach to the foreign network and continue to do so even if the UE is already attached to a non-preferred network. That is, there is a collision between the foreign network and the preferred network.

Figure 1:
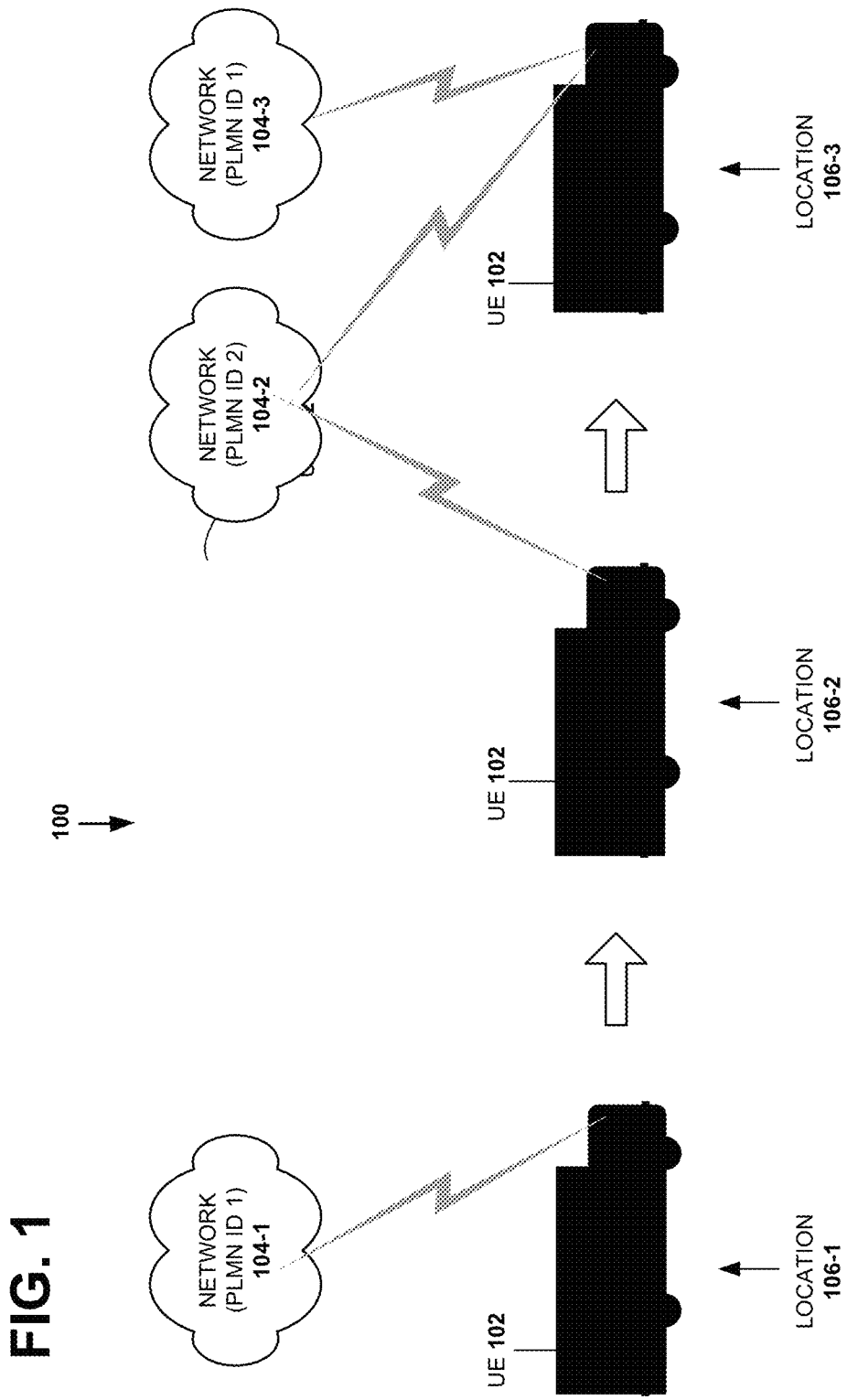
FIG. 1 illustrates concepts described herein.

FIG. 1 illustrates the concepts described herein. As shown, a scenario 100 includes a UE 102, a network 104-1, a network 104-2, and a network 104-3. UE 102 may be an autonomous vehicle, a mobile phone (e.g., a smart phone held by a driver of a truck), or another type of mobile device. Assume that a location 106-1 is in the coverage area of network 104-1; a location 106-2 is within the coverage area of network 104-2; and a location 106-3 is within the coverage areas of networks 104-2 and 104-3. Also assume that UE 102 is subscribed to networks 104-1 and 104-2 but not to network 104-3. In FIG. 1, network 104-1 is the preferred network for UE 102. Network 106-2 may be a non-preferred PLMN that has a unique PLMN ID (PLMN ID 2 in FIG. 1). Networks 104-1 and 104-3 may include private cellular networks that share the same PLMN ID (PLMN ID 1 in FIG. 1). For UE 102, network 104-1 is a primary network and network 104-2 is a secondary network.

UE 102 stores each PLMN ID (i.e., PLMN ID 1 and PLMN ID 2) in a PLMN list. The PLMN list includes a list of PLMN IDs in the order of priority. Accordingly, the first PLMN ID in the PLMN list is the preferred PLMN ID. Other PLMN IDs in the PLMN list are non-preferred PMN IDs (i.e., a PLMN ID of the network to which UE 102 may attach when the network is available and the higher priority networks identified in the PLMN list are not available for attachment).

In scenario 100, UE 102 moves from location 106-1 to location 106-2 and then to location 106-3. When UE 102 is at location 106-1, UE 102 discovers network 104-1 and attempts to attach to network 104-1. The attempt is successful since UE 102 is subscribed to network 104-1, which is the preferred network for UE 102. There is no network collision when UE 102 is at location 106-1.

UE 102 then moves out of the coverage area of network 104-1 to location 106-2. Consequently, UE 102 loses its connection to network 104-1 and discovers network 104-2. Next, UE 102 attempts to attach to network 104-2. Since UE 102 is subscribed to network 104-2, the attempt is successful. There is no network collision at location 106-2. Although PLMN ID 1 is listed before PLMN ID 2 in the PLMN list of UE 102, a network with PLMN ID 1 is not available for attachment.

When UE 102 moves to location 106-3, UE 102 is still attached to network 104-2. However, because location 106-3 is within the coverage area of network 104-3, UE 102 is able to detect a broadcast signal from network 104-3. Network 104-3 has the same PLMN ID as network 104-1 (PLMN ID 1), and hence the broadcast signal from network 104-3 carries PLMN ID 1. Based on the PLMN ID in the broadcast signal from network 104-3, UE 102 incorrectly determines that network 104-3 is its preferred network. Hence, it disconnects from network 104-2, and attempts to connect to network 104-3. However, because UE 102 is not subscribed to network 104-3, network 104-3 rejects UE 102's attempt to attach to network 104-3. UE 102 may continue to attempt to attach to network 104-3 repeatedly (e.g., every 2 minutes) as long as UE 102 is in the coverage area of network 104-3, wasting its energy and processing cycles.

In scenario 100, if UE 102 is implemented with the systems described herein, when UE 102 detects network 104-3 and is rejected by network 104-3, the system rewrites a portion of UE 102 memory (e.g., a UICC-like component in UE 102). In particular, UE 102 writes the PLMN ID of network 104-2 as the first PLMN ID in its list of PLMN list, making network 104-2 the preferred PLMN for UE 102.

Accordingly, when UE 102 scans for and discovers network 104-2, UE 102 reconnects to network 104-2 and stops trying to connect to network 104-3. When UE 102 moves out of the coverage area of network 104-3, the system rewrites the PLMN ID of its secondary network (network 104-2) so that PLMN ID 2 is no longer the first PLMN ID in the PLMN list. The PLMN ID (PLMN ID 1) that was the preferred PLMN ID before PLMN ID 2 became the preferred PLMN ID is now restored as the preferred PLMN ID. Thereafter, when UE 102 moves into the coverage area of network 104-1, UE 102 may attempt attach to network 104-1, regardless of whether UE 102 is attached to network 104-2.

Figure 2:
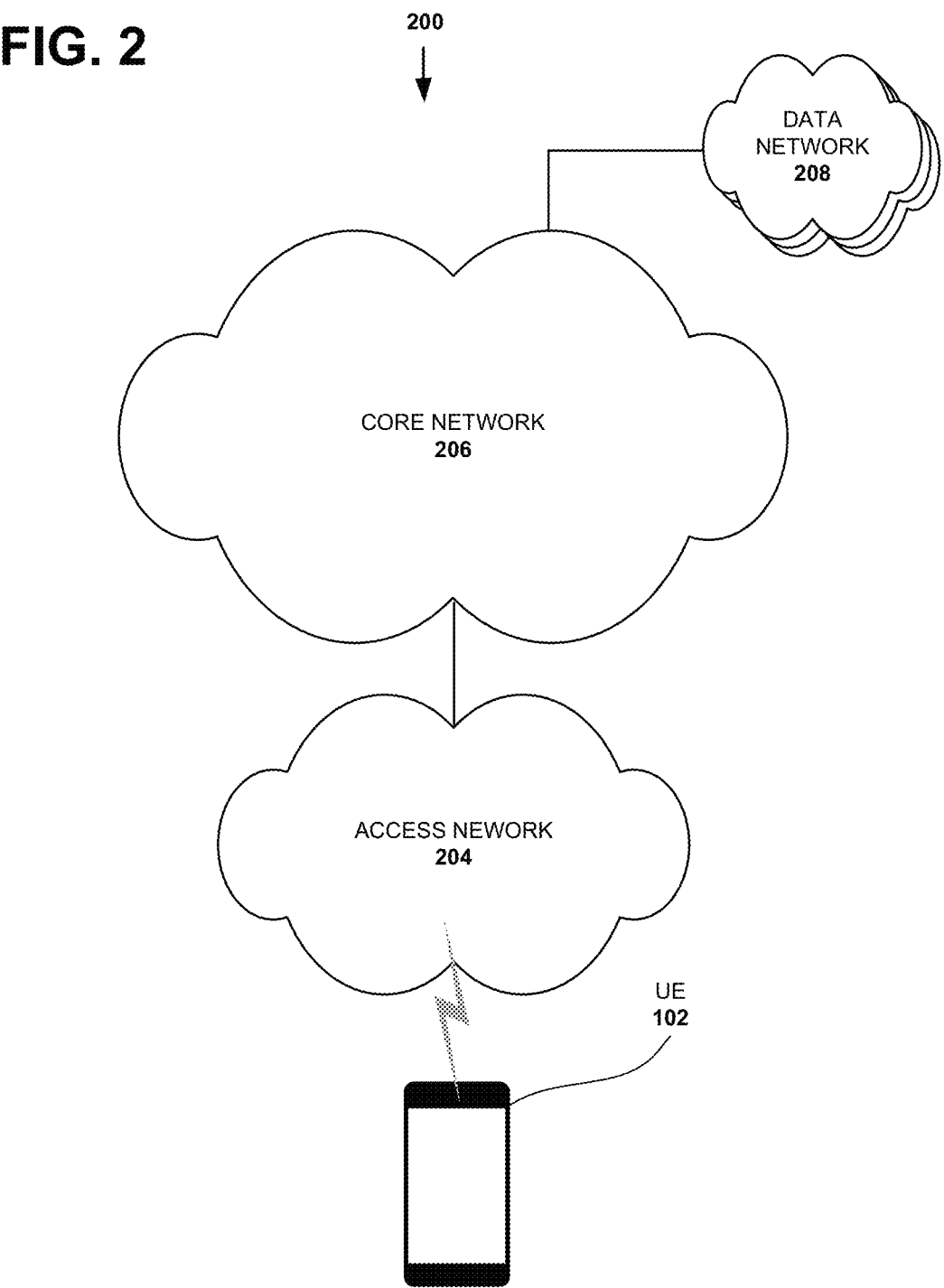
FIG. 2 illustrates an exemplary network environment in which the systems and methods described herein may be implemented.

FIG. 2 illustrates an exemplary network environment 200 in which the systems and methods described herein may be implemented. As shown, environment 200 may include a UE 102, an access network 204, a core network 206, and a data network(s) 208. In some implementations, access network 204, core network 206, and/or data network 208 may be part of a network that provides telecommunication services, such as network 104-1, 104-2, or 104-3. Each of networks 104 may be either a private network or a public network. A public network (e.g., a public PLMN) may typically provide a wider coverage than a private network, although such may not necessarily be the case in the current context. A service provider may own or operate a public PLMN (e.g., network 104-2). The service provider may manage private PLMNs (e.g., networks 104-1 and 104-3). As described below, UE 102 may include components of the systems for providing the methods for reducing network collisions.

UE 102 may include a wireless communication device, or a mobile terminal. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

UE 102 may include a list of PLMNs to which UE 102 is subscribed. UE 102 may have the ability to rewrite a PLMN ID in its PLMN list so that the order in which the PLMN ID appears in the list changes. For example, UE 102 may rewrite the PLMN ID of a non-preferred network in the list so that the PLMN ID appears first in the list. Since the PLMNs are listed in the order of priority for UE 102, the first PLMN ID in the list is the preferred PLMN ID. Accordingly, the rewrite causes the non-preferred network to be designated as the preferred network for UE 102. In another example, UE 102 may rewrite the preferred PLMN ID as a non-preferred PLMN ID (i.e., move the PLMN ID from the top of the list to another location in the list) so that the PLMN ID that was previously the preferred PLMN ID is restored as the preferred PLMN ID (i.e., the first PLMN ID in the list of PLMN IDs for UE 102).

UE 102 may perform a rewrite of PLMN ID either in response to detecting a change in its location and/or based on its failed attempt to attach to what appears to be the preferred network. As further described below, by performing rewrites of its secondary PLMN ID as the preferred PLMN ID or a non-preferred PLMN ID (e.g., move the secondary PLMN ID into or from the top position in the PLMN list), UE 102 may avoid having to continually attempt to attach to a particular network, which, by chance, may have the preferred PLMN ID and to which UE 102 is not subscribed.

Access network 204 may allow UE 102 to connect to core network 206, data network 208, and other devices associated with or included in network environment 200. To do so, access network 204 may establish and maintain, with participation from UE 102, an over-the-air and/or wired channel with UE 102 and maintain backhaul channels with core network 206. Access network 204 may convey information through these channels, from UE 102 to core network 206 and vice versa, over an access station (e.g., a base station).

Access network 204 may include a Long-Term Evolution (LTE) radio network (RAN), a private LTE RAN, a public LTE RAN, a Fifth Generation (5G) RAN, a private 5G RAN, a public 5G RAN, or another type of advanced RAN, a Local Area Network (LAN), a wide area network (WAN), or any type of network through which UE 102 can access core network 206 or data network 208. The RAN of access network 204 may operate in many different frequency ranges, including millimeter wave (mmWave) frequencies, sub 6 GHz frequencies, and/or other frequencies.

Access network 204 may include multiple access stations or access devices. An access device may include a 4G, 5G, or another type of access device (e.g., a wireless station, a base station, an evolved Node B (eNB), a next generation Node B (gNB), a Central Unit (CU), a Distributed Unit (DU), a Radio Units (RU), a gateway, etc.). Some access devices may include Radio Frequency (RF) transceivers for wireless or cellular communication. Other access devices may include gateway devices that serve as access points to one of networks 104. In some implementations, an access device may include Integrated Access and Backhaul (IAB) nodes (not shown). To advertise its presence or the presence of the network, an access device may include, within a system information block in the broadcast signal that it transmits, one or more PLMN IDs. After UE 102 detects the broadcast signal, discovers the PLMN IDs in the signal, discovers the network, and attaches to the access device, the access device may establish and maintain one or more connections with UE 102 and backhaul channels with core network 206.

Core network 206 may include 4G core network components, 5G core network components, or another type of core network components. Examples of 4G core network components include a Serving Gateway (SGW), a Packet data network Gateway (PGW), and a Mobility Management Entity (MME). Examples of 5G core network components include a User Plane Function (UPF), an Application Function (AF), an Access and Mobility Function (AMF), a Session Management Function (SMF), a Unified Data Management (UDM) function, a Network Slice Selection Function (NSSF), and a Policy Control Function (PCF). Core network 206 may allow the delivery of Internet Protocol (IP) services to UE 102 and may interface with other networks, such as data networks 208.

Data network 208 may include networks that are external to core network 206. In some embodiments, data networks 208 may include packet data networks, such as an Internet Protocol (IP) network or another type of network. For example, data networks 208 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN)), an intranet, or a combination of networks. In some implementations, data network 208 may provide a route through which UE 102 may connect to a particular PLMN.

For clarity, FIG. 2 does not show all components that may be included in the network environment 200 of FIG. 2 (e.g., routers, bridges, wireless access points, additional networks, Multi-Access Edge Computing (MEC) clusters, MEC networks, additional UEs 102, etc.). Depending on the implementation, network environment 200 may include additional, fewer, different, or a different arrangement of components than those illustrated in FIG. 2.

Figure 3:
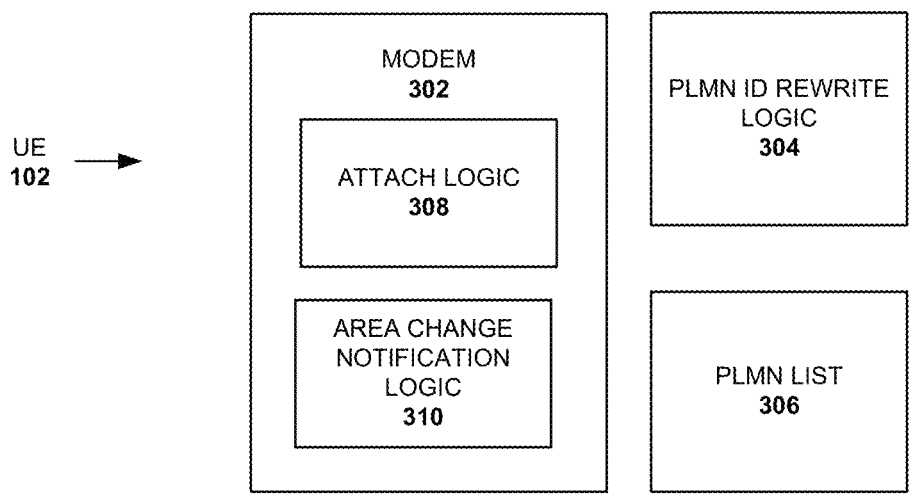
FIG. 3 illustrates exemplary logical components of a User Equipment device (UE) according to an implementation.

FIG. 3 illustrates exemplary logical components of UE 102, according to an implementation. As shown, UE 102 may include a modem 302, PLMN ID rewrite logic 304, and a PLMN list 306. These components 302-306 may implement logic for avoiding or reducing network collisions. For clarity, FIG. 3 does not show all components that may be included in UE 102. Furthermore, depending on the implementation, UE 102 may include additional, fewer, or different components for performing the logic than those illustrated in FIG. 3.

Modem 302 may perform communications for UE 102. For example, modem 302 may convert data to be transmitted into analog signals, modulate signals, upconvert, transmit, down convert, demodulate, etc. In addition, modem 302 may perform other aspects of signal processing, such as detecting a tracking area identifier, identifying a coverage area of a network based on the signal from the network, extracting a PLMN ID in a signal broadcast from a base station, and/or detecting other network parameters.

In one implementation, modem 302 may include attach logic 308 and area change notification logic 310. Although modem 302 may include other logic components, they are not illustrated in FIG. 3. Attach logic 308 may cause modem 302 to discover a network and attach to the network over a wireless link. For example, attach logic 308 may cause modem 302 to detect a broadcast signal from an access station in access network 204, obtain a PLMN ID from the broadcast signal, and compare the obtained PLMN ID with the preferred PLMN ID in PLMN list 306. If the obtained PLMN ID matches the preferred PLMN ID and UE 102 is not already attached to the preferred network, logic 308 may cause UE 102 to attempt to attach to the network over a wireless link and/or disconnect from another network to which UE 102 may already be attached.

If the obtained PLMN ID does not match the preferred PLMN ID but matches a non-preferred PLMN ID, logic 308 may cause UE 102 to attach to the network over a wireless link if UE 102 is not already attached to another network. If UE 102 is already attached, the logic 308 may not cause UE 102 to attach if the other network has a PLMN ID which appears before the obtained PLMN ID in PLMN list 306.

When attach logic 308 attempts to attach to the preferred network (e.g., based on comparing the PLMN ID of the discovered network and the preferred PLMN ID stored in the PLMN list 306) and the attempt fails, attach logic 308 may call the PLMN ID rewrite logic 304. The call may cause PLMN ID rewrite logic 304 to place a non-preferred PLMN ID (e.g., the secondary PLMN ID) at the top of the list of PLMN IDs in PLMN list 306. If the attempt to attach to the preferred network over a wireless link succeeds, attach logic 308 does not invoke PLMN ID rewrite logic 304.

Area change notification logic 310 may call PLMN ID rewrite logic 304 when a coverage area for a network changes due to a movement of the UE 102. In particular, area change notification logic 310 may determine whether UE 102 has moved out of a coverage area that is associated with a non-preferred PLMN (e.g., the primary PLMN of UE 102 when the primary PLMN is no longer the preferred PLMN). If so, area change notification logic 310 may call PLMN ID rewrite logic 304, to have logic 304 move the preferred PLMN ID from the top of the list of PLMN IDs in PLMN list 306 so that it is no longer the preferred PLMN ID. Area change notification logic 310 may not call the PLMN ID rewrite logic 304 when UE 102 moves out of the coverage area associated with the preferred PLMN (e.g., when the preferred is the primary PLMN) and UE 102 was attached to the preferred PLMN before the move.

PLMN ID rewrite logic 304, as indicated above, may rewrite a PLMN ID in PLMN list 306 so that the order in which the PLMN ID appears in PLMN list 306 changes. A particular PLMN ID may be rewritten or moved to the top of the list or moved from the top of the list to another position. In the latter case, the second PLMN ID in the list may become the first PLMN ID in the list.

PLMN list 306 may include a list of PLMN IDs corresponding to PLMNs to which UE 102 is subscribed. The PLMN IDs in list 306 are listed in the order of priority. For example, if two PLMN IDs are in PLMN list 306, the PLMN ID that appears first in the list has the priority over the other PLMN ID in the list. This means UE 102 (or modem 302) may attempt to attach to the PLMN identified by the first PLMN ID, before attempting to attach to the PLMN identified by the second PLMN ID. If the attempt to attach to the PLMN of the first PLMN ID succeeds, UE 102 may not attempt to attach to the PLMN identified by the second PLMN ID.

Depending on the implementation, UE 102 may or may not include information that indicates whether each PLMN ID in PLMN list 306 is a primary PLMN ID or a secondary PLMN ID. In some implementations, the list of PLMN IDs in PLMN list 306 may include, for example, Equivalent Home PLMN (EHPLMN) IDs.

FIG. 4A is a flow diagram of an exemplary process 400 that is associated with avoiding multiple network collisions, according to an implementation. Process 400 may be performed by a modem 302 or another processor in UE 102 by executing a program. The program may be stored in a storage local to modem 302, in a SIM, USIM, eSIM, UICC, eUICC, or another SIM-like device in UE 102. Assume that UE 102 has entered a coverage area of a cellular network. The cellular network may be a public cellular network 104-2 to which UE 102 is subscribed (e.g., the secondary network or PLMN for the UE 102), a private cellular network 104-1 to which UE 102 is subscribed (e.g., the primary network or PLMN for the UE 102), or a private cellular network 104-3 to which UE 102 is not subscribed. Assume that the private cellular networks 104-1 and 104-3 have the same PLMN ID. Furthermore, assume that, just before process 400 starts, the preferred PLMN ID is also the primary PLMN ID, and a non-preferred PLMN ID is the secondary PLMN ID.

As shown, process 400 may include UE 102 determining whether it is attached to the preferred network (block 402). For example, UE 102 may determine whether UE 102 is attached and, if so, the PLMN ID of the network to which UE 102 is attached is its preferred PLMN ID. If UE 102 is already attached to the preferred network (block 402: YES), process 400 may terminate. By not further performing acts in blocks 404-420, UE 102 may save its energy and processing cycles. If UE 102 determines that UE 102 is not attached to the preferred network (block 402: NO), UE 102 may scan for a broadcast signal. Eventually, UE 102 may detect a signal whose PLMN ID is in the PLMN list 306 of UE 102 (block 404).

At block 406, UE 102 may determine whether the PLMN ID obtained from the signal is the preferred PLMN ID (block 406). If UE 102 determines the PLMN ID is not the preferred PLMN ID but a non-preferred PLMN ID (block 406: NO), UE 102 may determine whether UE 102 is attached to a non-preferred PLMN (block 408). If UE 102 is already attached to a non-preferred network (e.g., the secondary network) (block 408: YES), process 400 may terminate. Otherwise (block 408: NO), UE 102 may attempt to attach to the PLMN over a wireless link (block 410) since UE 102 would not be currently attached to any network. Assuming that UE 102 attaches (since the network would be the secondary network of UE 102), process 400 may then terminate.

Returning to block 406, if the PLMN ID obtained from the signal is the preferred PLMN ID (block 406: YES), UE 102 may determine whether it is attached to a non-preferred network (block 412). If UE 102 determines that it is not attached to a non-preferred network (block 412: NO), process 400 may proceed block 416. At block 412, if UE 102 determines that it is attached to a non-preferred network (block 412: YES), UE 102 may detach from the non-preferred network and then proceed to block 416.

At block 416, UE 102 may attempt to attach to the detected network over a wireless link. If the attempt is successful (block 418: YES), process 400 may terminate. Otherwise (block 418: NO), the network to which UE 102 just attempted to attach is not the preferred network (or it is unavailable). Accordingly, UE 102 may write its non-preferred PLMN ID (secondary PLMN ID) in its PLMN list 306 as the first PLMN ID in PLMN list 306 (block 420). This would prevent UE 102 from having to continually attempt to attach to the detected network.

Figure 4B:
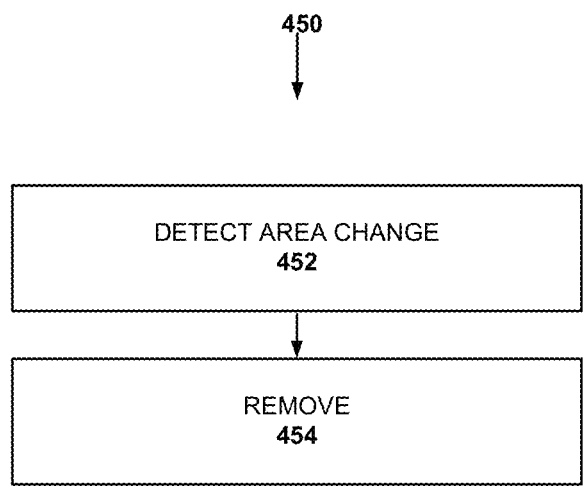

FIG. 4B is a flow diagram of an exemplary process 450 that is associated with avoiding multiple network collisions, according to an implementation. Like process 400, process 450 may be performed by a modem 302 or another processor. Assume that when UE 102 was in a coverage area of a private network (whose PLMN ID is the same as the PLMN ID of its primary PLMN but to which UE 102 is not subscribed), UE 102 has rewritten its secondary PLMN ID as the preferred PLMN ID. Also assume, subsequent to the rewrite, UE 102 has just moved out of the coverage area of the network which rejected UE 102's request to attach.

As shown, process 450 may include UE 102 detecting that it has moved out of the coverage area of a cellular network to which UE 102 has attempted to attach but failed to attach (block 452). Upon detecting the change, UE 102 may rewrite its preferred PLMN ID (the secondary PLMN ID) as its non-preferred PLMN ID (block 454) (e.g., change the secondary PLMN ID from being the first PLMN ID in PLMN list 306, rendering the primary PLMN ID to become the new preferred PLMN ID). After the rewrite, UE 102 may attempt to attach to its primary PLMN (which has become its preferred PLMN) when it detects the primary PLMN ID in a broadcast signal, even if UE 102 is already attached to a non-preferred PLMN (the secondary PLMN).

Figure 5A:
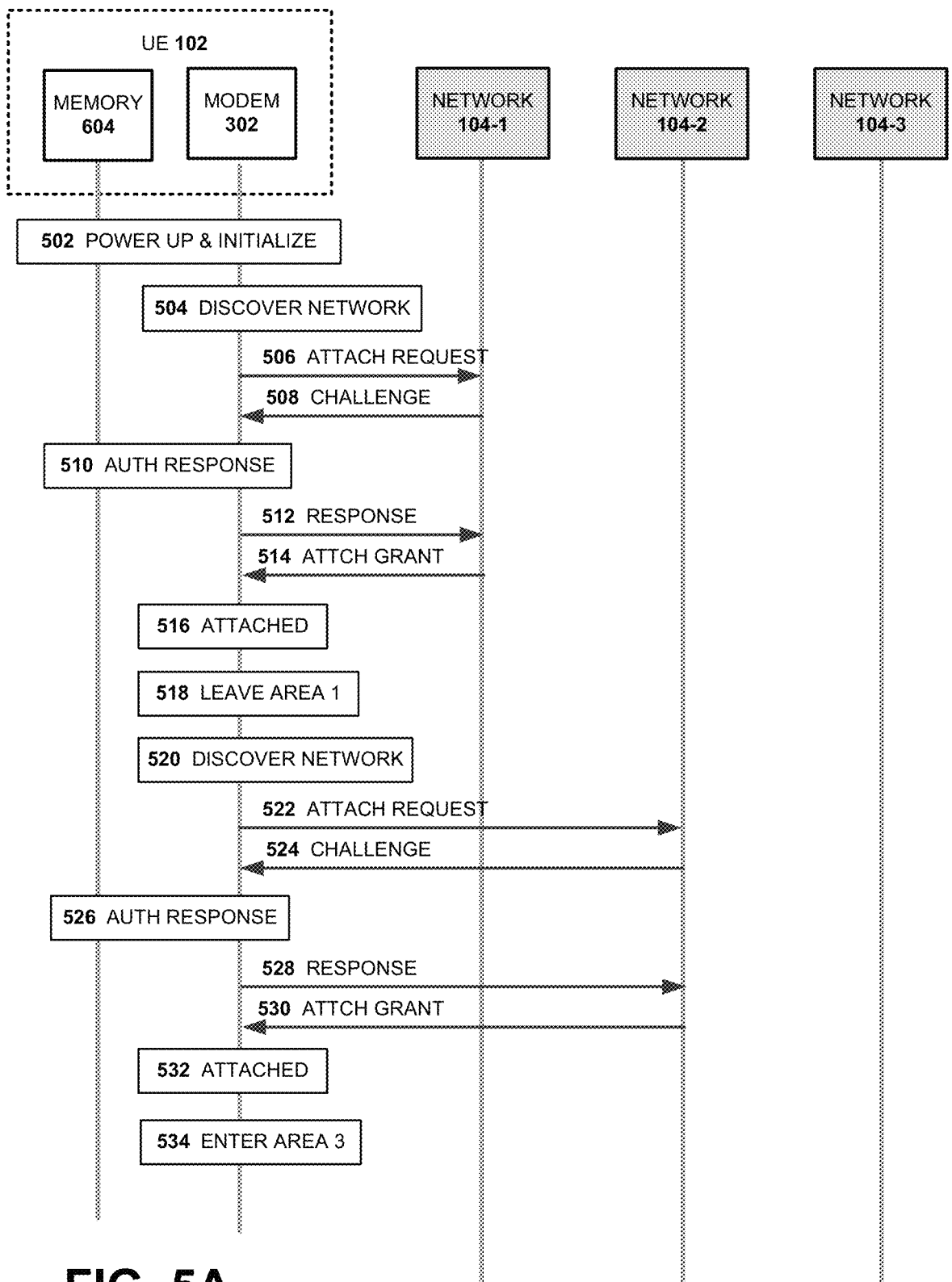
FIGS. 5A-5C are a signaling diagram that is associated with an exemplary scenario in which a UE avoids multiple network collisions, according to one implementation.
Figure 5B:
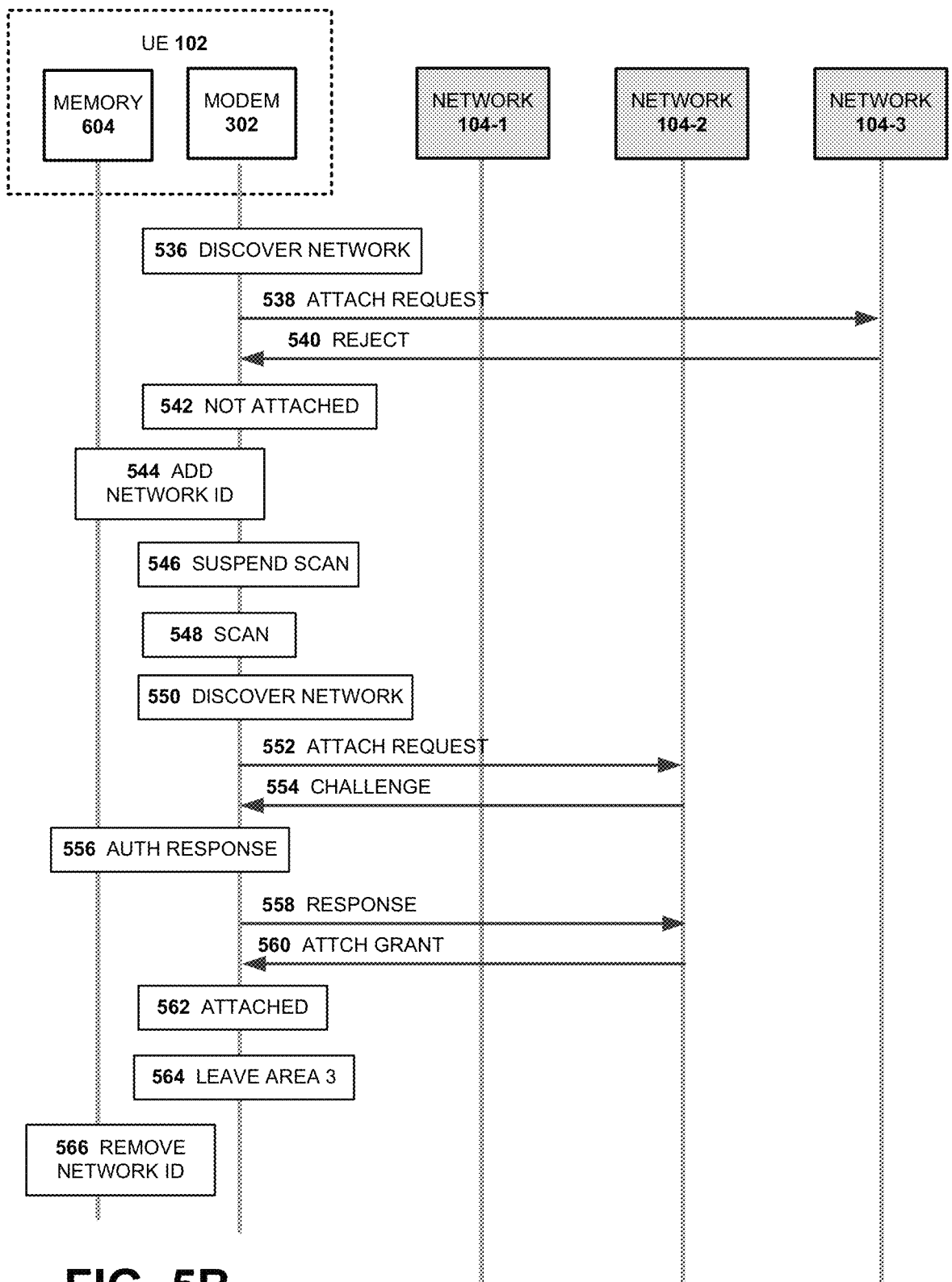
Figure 5C:
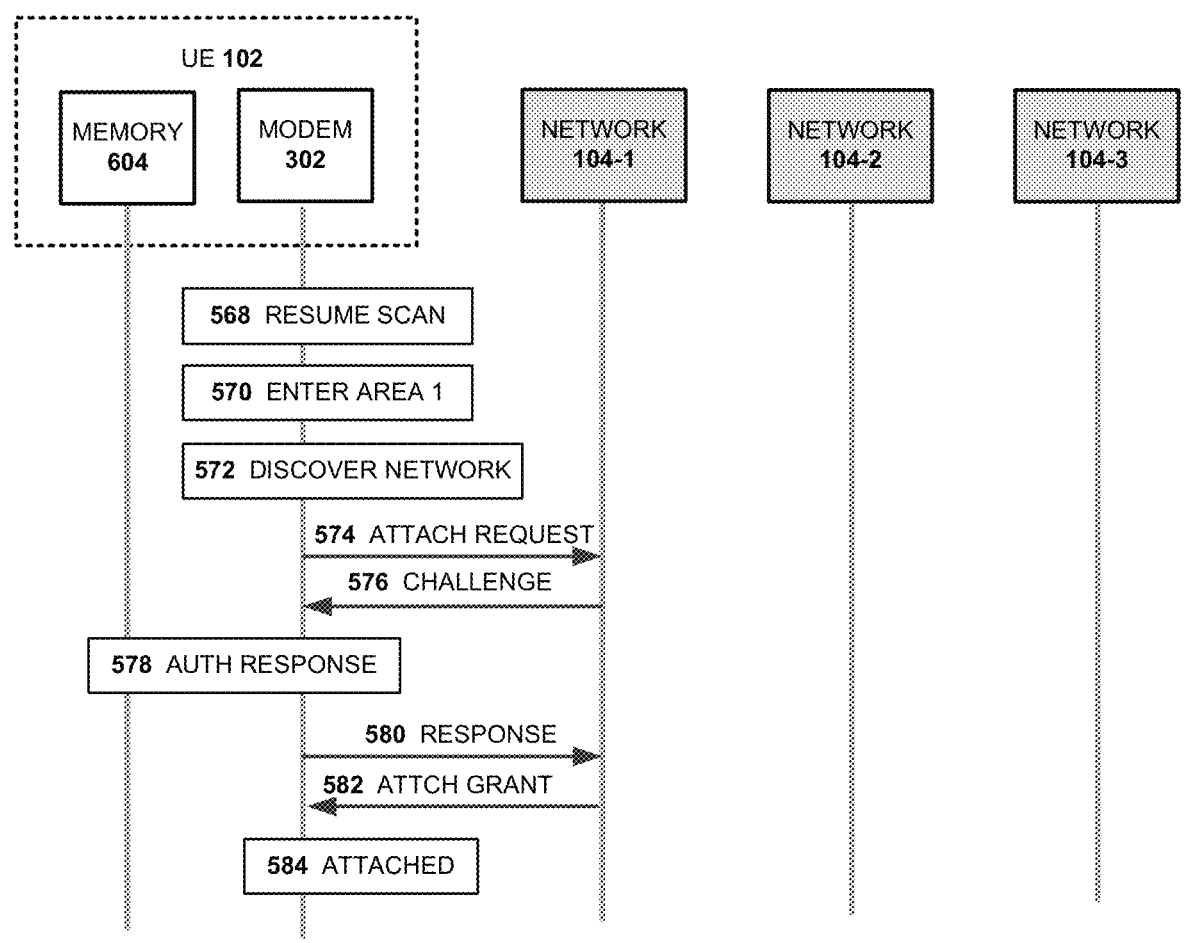

FIGS. 5A-5C are a signaling diagram associated with avoiding multiple network collisions, according to an implementation. More specifically, FIGS. 5A-5C depict exchange of signals and performance of tasks as UE 102 moves through coverage areas of network 104-1, network 104-2, and 104-3. Assume that the corresponding PLMN IDs for networks 104 are: PLMN ID 1, PLMN ID 2, and PLMN ID 1. Also assume that PLMN ID 1 is stored in UE 102 as the preferred PLMN ID; and that PLMN ID 2 is stored in UE 102 as a non-preferred ID. UE 102 is subscribed to network 104-1 and network 104-2 but not to network 104-3. Networks 104-1, 104-2, and 104-3 have a first coverage area, a second coverage area, and a third coverage area, respectively. The second coverage area overlaps the third coverage area. Networks 104-1 and 104-2 are, respectively, a primary PLMN and a secondary PLMN.

As shown, UE 102 powers up and initializes (block 502). UE 102 scans for and detects a broadcast signal from network 104-1. As a result, UE 102 discovers network 104-1 (block 504) based on the broadcast signal. Upon discovering network 104-1, UE 102 then obtains PLMN ID 1, compares the PLMN ID to the preferred PLMN ID in its PLMN list 306. UE 102 determines that PLMN ID 1 is the preferred PLMN ID, and since UE 102 is not attached to its preferred network, attempts to attach to network 104-1.

In making the attempt, UE 102 sends an attach request to network 104-1 (arrow 506), which then responds with an authentication challenge (arrow 508). UE 102 then prepares an authentication response (block 510) and sends the authentication response to network 104-1 (arrow 512). Network 104-1 then checks UE 102 credentials and recognizes that UE 102 is subscribed to network 104-1 (e.g., based on its subscription information stored at network 104-1). Network 104-1 forwards an attach grant message to UE 102 (arrow 514). UE 102 is then attached to network 104-1 (block 516).

Next, UE 102 leaves the first coverage area (block 518) and enters the second coverage area. Because the second coverage area is outside the coverage area of network 104-1, UE 102 loses its connection to network 104-1. UE 102 scans for and detects a broadcast signal from network 104-2. Consequently, UE 102 discovers network 104-2 (block 520) based on the broadcast signal. Upon discovering network 104-2, UE 102 obtains the PLMN ID 2, compares the PLMN ID to PLMN IDs in its PLMN list 306. UE 102 determines that PLMN ID 2 is a non-preferred PLMN ID (i.e., PLMN ID 2 is not the first PLMN ID in PLMN list 306). Since UE 102 is not attached to any network, UE 102 attempts to attach to network 104-2.

In attempting to attach to network 104-2, UE 102 performs similar tasks that UE 102 performed to attach to network 104-1. UE 102 sends an attach request to network 104-2 (arrow 522), which then replies with an authentication challenge (arrow 524). Upon receipt of the reply, UE 102 prepares an authentication response (block 526) and sends the authentication response to network 104-2 (arrow 528). Network 104-2 then checks UE 102 credentials and recognizes that UE 102 is authorized to access network 104-2 based on UE 102 subscription information stored at network 104-2. Network 104-2 forwards an attach grant message to UE 102 (arrow 530). UE 102 then becomes attached to network 104-2 (block 532).

Later, UE 102 enters the third coverage area, but without leaving the second coverage area (block 534). UE 102 scans for and detects a broadcast signal from network 104-3 and discovers network 104-3 (block 536) based on the broadcast signal. Upon discovering network 104-3, UE 102 then obtains the PLMN ID 1 (which is also the PLMN ID 1 for network 104-1), compares the PLMN ID to the PLMN IDs in its PLMN list 306. UE 102 determines that the PLMN ID 1 is the preferred PLMN ID. Since UE 102 is attached to a non-preferred network (network 104-2), UE 102 detaches from network 104-2 and attempts to attach to network 104-3.

In attempting to attach to network 104-3, UE 102 performs similar tasks that UE 102 performed to attach to network 104-1 or network 104-2. UE 102 sends an attach request to network 104-3 (arrow 538). Network 104-3 looks up UE 102 credentials and determines that UE 102 is not subscribed to network 104-3. As a result, network 104-3 issues a rejection message (arrow 540). Consequently, UE 102 fails to attach to network 104-3 and becomes not attached to any network (block 542).

In response to the failure to attach to network 104-3, UE 102 add its secondary PLMN ID to PLMN list as the preferred PLMN ID (block 544). For example, UE 102 may rewrite PLMN ID 2, in its list of PLMN IDs, as the first PLMN ID (e.g., move PLMN ID 2 in list 306 to be the first PLMN ID in list 306). UE 102 suspends scanning for a broadcast signal from what was previously the preferred PLMN (block 546) but scans for a broadcast signal from its current preferred PLMN, which is network 104-2 (block 548). Based on the signal, UE 102 rediscovers network 104-2 (block 550). Upon discovering network 104-2, UE 102 obtains the PLMN ID 2 from the broadcast signal and compares the PLMN ID to those in its PLMN list 306. UE 102 determines that PLMN ID 2 matches the preferred PLMN ID. Since UE 102 is not attached to the preferred PLMN, UE 102 attempts to attach to network 104-2.

In attempting to attach to network 104-2, UE 102 performs similar tasks that UE 102 performed previously to attach to network 104-2. UE 102 sends an attach request to network 104-2 (arrow 552), which then responds with an authentication challenge (arrow 554). UE 102 prepares an authentication response (block 556) and sends the authentication response to network 104-2 (arrow 558). Network 104-2 then checks UE 102 credentials and recognizes that UE 102 is authorized to access network 104-2 (e.g., based on its subscription information at network 104-2). Network 104-2 forwards an attach grant message to UE 102 (arrow 560). UE 102 is then attached to network 104-2 (block 562).

Eventually, UE 102 leaves the third coverage area (block 564). When it leaves the third coverage area, UE 102 detects that it has left a coverage area of its primary PLMN (also currently its non-preferred PLMN), and in response, rewrites the preferred PLMN ID (also the secondary PLMN ID) as a non-preferred PLMN ID. For example, UE 102 may remove the secondary PLMN ID as the first PLMN ID in list 306 and place it below the primary PLMN ID in list 306 (block 566). As a consequence, what was previously the non-preferred PLMN ID becomes the preferred PLMN ID. Accordingly, UE 102 resumes scanning for a broadcast signal from its primary PLMN (block 568) since the primary PLMN is now the preferred PLMN and UE 102 is not attached to the preferred PLMN.

When UE 102 re-enters the first coverage area (570), UE 102 is thus enabled to attach to its primary network. UE 102 scans for and detects a broadcast signal from network 104-1 (block 572). As a result, UE 102 discovers network 104-1 (block 574) based on the broadcast signal. Upon discovering network 104-1, UE 102 obtains PLMN ID 1 from the signal, compares the PLMN ID to PLMN IDs in its PLMN list 306. UE 102 determines that PLMN ID 1 is the preferred PLMN ID and attempts to attach to network 104-1, regardless of whether UE 102 is already attached to network 104-2.

In making the attempt, UE 102 sends an attach request to network 104-1 (arrow 574), which then responds with an authentication challenge (arrow 576). UE 102 (i.e., modem 302) then prepares an authentication response (block 578) and sends the authentication response to network 104-1 (arrow 580). Network 104-1 checks UE 102 credentials and recognizes that UE 102 is authorized to network 104-1. Network 104-1 forwards an attach grant message to UE 102 (arrow 582). UE 102 is then becomes attached to network 104-1 (block 584).

Figure 6:
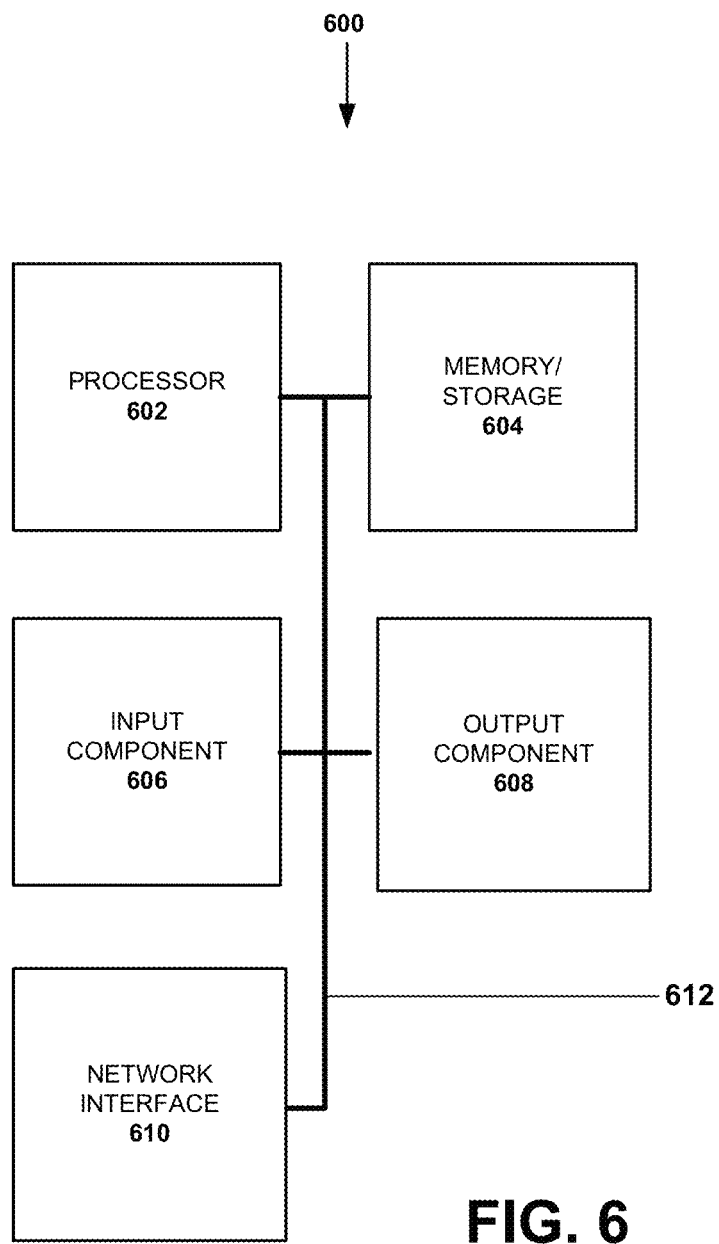
FIG. 6 depicts example components of a network device, according to an implementation.

FIG. 6 depicts example components of an example network device 600. Network device 600 corresponds to or is included in UE 102 and/or any of the network components of FIGS. 1-3 and 5A-5C (e.g., a router, a network switch, servers, gateways, etc.). As shown, network device 600 includes a processor 602, memory/storage 604, input component 606, output component 608, network interface 610, and communication path 612. In different implementations, network device 600 may include additional, fewer, different, or a different arrangement of components than the ones illustrated in FIG. 6. For example, network device 600 may include a switch fabric, a graphics card, etc.

Processor 602 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 600 and/or executing programs/instructions.

Memory/storage 604 may include static memory, such as read only memory (ROM), and/or dynamic memory, such as random access memory (RAM), or onboard cache, for storing data and machine-readable instructions (e.g., programs, scripts, etc.).

Memory/storage 604 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 604 may be external to and/or removable from network device 600. Memory/storage 604 may include, for example, a Universal Serial Bus (USB) memory stick, a dongle, a hard disk, off-line storage, a Blu-Ray® disk (BD), etc. Depending on the context, the term "memory," "storage," "storage device," "storage unit," and/or "medium" may be used interchangeably. For example, a "computer-readable storage device" or "computer-readable medium" may refer to both a memory and/or storage device.

Input component 606 and output component 608 may provide input and output from/to a user to/from network device 600. Input and output components 606 and 608 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 600.

Network interface 610 may include a transceiver (e.g., a transmitter and a receiver) for network device 600 to communicate with other devices and/or systems. For example, via network interface 610, network device 600 may communicate with wireless station 208.

Network interface 610 may include an Ethernet interface to a LAN, and/or an interface/connection for connecting network device 600 to other devices (e.g., a Bluetooth interface). For example, network interface 610 may include a wireless modem for modulation and demodulation.

Communication path 612 may enable components of network device 600 to communicate with one another.

Network device 600 may perform the operations described herein in response to processor 602 executing software instructions stored in a non-transient computer-readable medium, such as memory/storage 604. The software instructions may be read into memory/storage 604 from another computer-readable medium or from another device via network interface 610. The software instructions stored in memory or storage (e.g., memory/storage 604, when executed by processor 602, may cause processor 602 to perform processes that are described herein. For example, UE 102 may include a SIM-like device, such as eSIM, USIM, UICC, eUICC, etc. Each of such devices may include various programs for performing some of the above-described functions and processes. Furthermore, such devices may store data, such as PLMN list 306.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and arrows have been described above with regard to the processes and signals illustrated in FIGS. 4, 5A, 5B, and 5C the order of the blocks and arrows may be modified in other implementations. In addition, non-dependent blocks and arrows may represent actions and messages that can be performed or exchanged in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising a processor to:
   obtain a Public Land Mobile Network (PLMN) identifier (ID) from a signal broadcast by a network;
   determine whether the obtained PLMN ID is an original preferred PLMN ID, from a list of PLMN IDs, of the device; and
   when the obtained PLMN ID is determined to be the original preferred PLMN ID,
      attempt to attach to the network over a wireless link, and
      when the attempt to attach to the network fails,
         rewrite, in the list of PLMN IDs, a non-preferred PLMN ID as a new preferred PLMN ID.

2. The device of claim 1, wherein when the processor attempts to attach to the network, the processor is to:
   send an attachment request to the network; and
   receive, from the network, in response to the attachment request, an authentication challenge.

3. The device of claim 1, wherein, when the attempt to attach to the network fails, the processor is to:
   receive a message, from the network, which rejects a request from the device to attach to the network.

4. The device of claim 1, wherein when the processor rewrites the non-preferred PLMN ID, the processor places the non-preferred PLMN ID as the first PLMN ID in a list of Equivalent Home PLMN IDs.

5. The device of claim 1, wherein when the processor rewrites the non-preferred PLMN ID as the new preferred PLMN ID, the processor is further to:
   suspend scanning for a broadcast signal that carries the original preferred PLMN ID.

6. The device of claim 1, wherein when the obtained PLMN ID is determined not to be the original preferred PLMN ID, the processor is further to:
   determine whether the device is attached a non-preferred network of the device, and
   when the device is determined not to be attached to the non-preferred network of the device, attempt to attach to the non-preferred network.

7. The device of claim 1, wherein the device comprises a modem.

8. The device of claim 1, wherein the processor is further to:
rewrite, in the list, the new preferred PLMN ID as a non-preferred PLMN ID when the device moves out of a coverage area of the network.

9. The device of claim 1, wherein the list of PLMN IDs is stored in a memory device comprising one of:
a Universal Integrated Circuit Card (UICC);
an embedded UICC;
a Subscriber Identity Module (SIM); or
an embedded SIM.

10. A method comprising:
obtaining a Public Land Mobile Network (PLMN) identifier (ID) from a signal broadcast by a network;
determining whether the obtained PLMN ID is an original preferred PLMN ID, from a list of PLMN IDs, of a device; and
when the obtained PLMN ID is determined to be the original preferred PLMN ID,
attempting to attach to the network over a wireless link, and
when the attempt to attach to the network fails,
rewriting, in the list of PLMN IDs, a non-preferred PLMN ID as a new preferred PLMN ID.

11. The method of claim 10, wherein attempting to attach to the network includes:
sending an attachment request to the network; and
receiving, from the network, in response to the attachment request, an authentication challenge.

12. The method of claim 10, wherein when the attempt to attach to the network fails, the method further comprises:
receiving a message, from the network, which rejects a request from the device to attach to the network.

13. The method of claim 10, wherein rewiring the non-preferred PLMN ID includes placing the non-preferred PLMN ID as the first PLMN ID in a list of Equivalent Home PLMN IDs.

14. The method of claim 10, wherein rewriting the non-preferred PLMN ID includes:
suspending scanning for a broadcast signal that carries the original preferred PLMN ID.

15. The method of claim 10, wherein when the PLMN ID is determined not to be the original preferred PLMN ID, the method further comprises:
determining whether the device is attached a non-preferred network of the device, and
when the device is determined not to be attached to the non-preferred network of the device, attempting to attach the device to the non-preferred network.

16. The method of claim 10, wherein the device includes a modem.

17. The method of claim 10, further comprising:
rewriting, in the list, the new preferred PLMN ID as a non-preferred PLMN ID when the device moves out of a coverage area of the network.

18. The method of claim 10, wherein the list of PLMN IDs is stored in a memory device comprising one of:
a Universal Integrated Circuit Card (UICC);
an embedded UICC;
a Subscriber Identity Module (SIM); or
an embedded SIM.

19. A non-transitory computer-readable medium comprising processor-executable instructions, wherein when a processor in a device executes the instructions, the processor is configured to:
obtain a Public Land Mobile Network (PLMN) identifier (ID) from a signal broadcast by a network; and
determine whether the obtained PLMN ID is an original preferred PLMN ID, from a list of PLMN IDs, of the device;
when the obtained PLMN ID is determined to be the original preferred PLMN ID,
attempt to attach to the network over a wireless link, and
when the attempt to attach to the network fails,
rewrite, in list of PLMN IDs, a non-preferred PLMN ID as a new preferred PLMN ID.

20. The non-transitory computer-readable medium of claim 19, wherein when the processor attempts to attach to the network, the processor is configured to:
send an attachment request to the network; and
receive, from the network in response to the attachment request, an authentication challenge.

* * * * *